(12) United States Patent
Morris

(10) Patent No.: US 9,540,933 B2
(45) Date of Patent: Jan. 10, 2017

(54) PROGRESSIVE CAVITY PUMP/MOTOR STATOR INCLUDING FRAMEWORK ELEMENTS AND GROOVES DEFINING CHAMBERS

(71) Applicant: National Oilwell Varco, L.P., Houston, TX (US)

(72) Inventor: Andrew Morris, Derbyshire (GB)

(*) Notice: Subject to any disclaimer, the term of this patent is extended or adjusted under 35 U.S.C. 154(b) by 128 days.

(21) Appl. No.: 14/378,861

(22) PCT Filed: Feb. 13, 2013

(86) PCT No.: PCT/GB2013/050334
§ 371 (c)(1),
(2) Date: Aug. 14, 2014

(87) PCT Pub. No.: WO2013/124626
PCT Pub. Date: Aug. 29, 2013

(65) Prior Publication Data
US 2016/0017711 A1    Jan. 21, 2016

(30) Foreign Application Priority Data
Feb. 22, 2012 (GB) .................................. 1203025.0

(51) Int. Cl.
*F01C 1/10*   (2006.01)
*F03C 2/00*   (2006.01)
(Continued)

(52) U.S. Cl.
CPC .............. *F01C 21/106* (2013.01); *B23P 15/00* (2013.01); *F01C 1/101* (2013.01); *F01C 5/00* (2013.01);
(Continued)

(58) Field of Classification Search
CPC ... F04C 18/1075; F04C 2/1071; F04C 2/1073; F04C 2/1075; F04C 2240/10; F04C 2240/802; F01C 1/101; F01C 5/00; F01C 5/02; Y10T 29/49272; F04B 53/16; F04B 39/14; B23P 15/00
(Continued)

(56) References Cited

U.S. PATENT DOCUMENTS 4,211,521 A * 7/1980 Streicher ............... F04C 2/1075
                                                         418/48
7,316,548 B2   1/2008 Jager
(Continued)

FOREIGN PATENT DOCUMENTS

CA    2409054 C    9/2009
CN    1729361 A    2/2006
(Continued)

OTHER PUBLICATIONS

Chinese Office Action dated Nov. 16, 2015, for Chinese Application No. 201380021129.4 (7 p.).
(Continued)

*Primary Examiner* — Theresa Trieu
(74) *Attorney, Agent, or Firm* — Conley Rose, P.C.

(57) ABSTRACT

A stator for a progressive cavity pump or motor includes a stator housing having a longitudinal axis. In addition, the stator includes a stator insert of a material moulded within the housing. The stator housing includes an outer tube having an inner surface. The stator housing also includes a plurality of framework elements disposed on the inner surface of the outer tube. Further, the stator housing includes at least one recess in the inner surface of the outer tube. The conjunction of the framework elements and the at least one recess define a plurality of chambers receiving insert material therein whereby the insert material is mechanically fixed axially, radially and torsionally within the outer tube.

12 Claims, 5 Drawing Sheets

(51) Int. Cl.
*F03C 4/00* (2006.01)
*F04C 2/00* (2006.01)
*F01C 21/10* (2006.01)
*F04C 2/107* (2006.01)
*F01C 5/00* (2006.01)
*F01C 5/02* (2006.01)
*B23P 15/00* (2006.01)
*F04C 18/107* (2006.01)
*F04B 39/14* (2006.01)

(52) U.S. Cl.
CPC ............ *F01C 5/02* (2013.01); *F04C 2/1071* (2013.01); *F04C 2/1073* (2013.01); *F04C 2/1075* (2013.01); *F04C 18/1075* (2013.01); *F04B 39/14* (2013.01); *F04C 2240/10* (2013.01); *F04C 2240/802* (2013.01); *Y10T 29/49272* (2015.01)

(58) Field of Classification Search
USPC ............ 418/48, 152–153, 1; 29/888.02
See application file for complete search history.

(56) References Cited

U.S. PATENT DOCUMENTS

| | | | |
|---|---|---|---|
| 7,329,106 | B2 | 2/2008 | Jaget et al. |
| 7,407,372 | B2 | 8/2008 | Guidry et al. |
| 8,033,802 | B2 | 10/2011 | Tekneyan et al. |
| 2007/0140883 | A1* | 6/2007 | Lievestro ............ F04C 2/1075 418/48 |
| 2011/0150685 | A1 | 6/2011 | Wilbourn et al. |

FOREIGN PATENT DOCUMENTS

| | | |
|---|---|---|
| CN | 101443556 A | 5/2009 |
| DE | 3139208 A1 | 4/1983 |
| DE | 3218714 A1 | 11/1983 |
| DE | 3312197 A1 | 10/1984 |
| EP | 0612922 A1 | 8/1994 |
| GB | 1235262 A | 6/1971 |
| GB | 2481226 A | 12/2011 |
| RU | 2417300 C1 | 4/2011 |

OTHER PUBLICATIONS

English Summary of Chinese Office Action dated Nov. 16, 2015, for Chinese Application No. 201380021129.4 (1 p.).
Australian Examination Report dated Oct. 23, 2015, for Australian Application No. 2013223856 (4 p.).
Search Report for British Application No. 1203025.0 dated Jun. 25, 2012 (3 p.).
PCT/GB2013/050334 International Search Report and Written Opinion dated Jul. 29, 2013 (10 p.).
PCT/GB2013/050334 International Preliminary Report on Patentability dated Aug. 26, 2014 (6 p.).

* cited by examiner

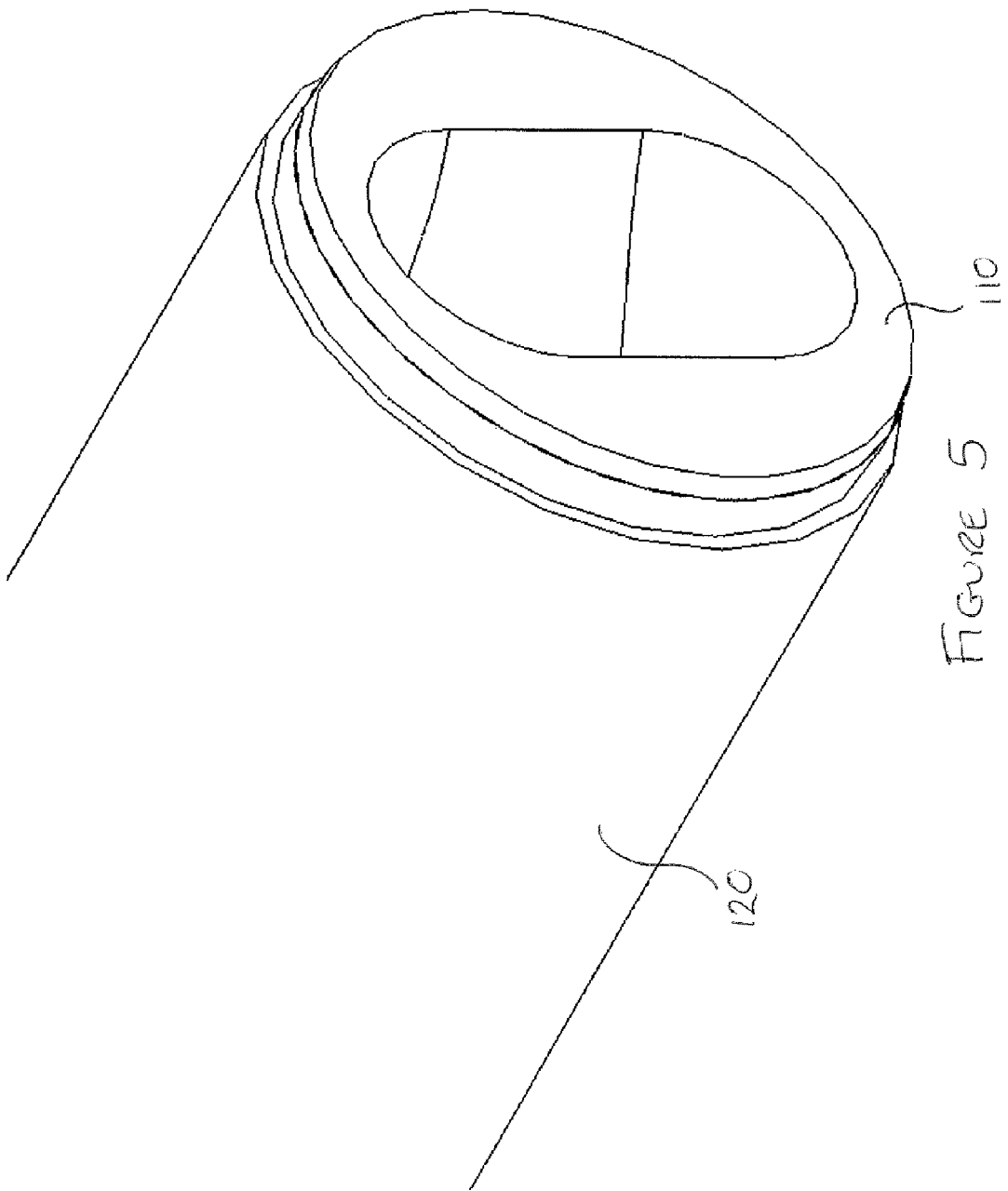

PROGRESSIVE CAVITY PUMP/MOTOR STATOR INCLUDING FRAMEWORK ELEMENTS AND GROOVES DEFINING CHAMBERS

CROSS-REFERENCE TO RELATED APPLICATIONS

This application is a 35 U.S.C. §371 national stage application of PCT/GB2013/050334 filed Feb. 13, 2013 and entitled "Stator for Progressive Cavity Pump/Motor," which claims priority to British Application No. 1203025.0 filed Feb. 22, 2012 and entitled "Stator for Progressive Cavity Pump/Motor," both of which are hereby incorporated herein by reference in their entirety for all purposes.

STATEMENT REGARDING FEDERALLY SPONSORED RESEARCH OR DEVELOPMENT

Not applicable.

BACKGROUND

The present disclosure relates to the construction of the stator of a progressive cavity pump or motor, and a method of assembly therefor.

Progressive Cavity (PC) pumps and motors have been used for years. The principle of operation of PC pumps was first described by Rene Moineau in his 1931 thesis and has since been known as the Moineau principle. Typically a PC pump or motor consists of a rigid helical rotor in a double-lead helical cavity stator. The differences in the leads between the rotor and the stator form cavities that progress axially from one end of the stator to the other as the rotor turns, moving the fluid through the pump or motor.

The stator is conventionally made of an elastomeric or plastic insert housed into a typically metallic, rigid, sleeve-shaped outer tube. The helical profile of the stator insert is typically formed by injection moulding the elastomeric or plastic material into the outer tube around a core. During normal operation of a PC pump, the rotor operates in tight contact with the stator insert, generating a high torsional force between the rotor and the stator. Accordingly, a tight bond is required between the stator insert and the outer tube in order to obtain a torsionally rigid structure. Additionally, a tight bond is required in order to provide a fluid seal between the stator insert and the outer tube.

The stator insert may simply be moulded inside a bare tube and be attached to the outer tube by bonding it to the inside of the outer tube using adhesives. Bonding using an adhesive, however, limits the use of the stator to an operational temperature and chemical environment required by the adhesive. Operating conditions beyond the temperature and chemical environment required may lead to the breakdown of the bond causing the stator insert to detach from the outer tube.

It is well known, in many situations where rubber or elastomer is to be connected to a rigid body, to use not only bonding, whether by natural adhesion of the elastomer or by assisted adhesion with a chemical bonding agent, but also to provide a mechanical connection. This is potentially achieved by providing re-entrants in the body to which the elastomer is being connected to achieve a mechanical interlock. It is also achieved by providing a cage or the like fixed to the body by some means, and through which cage the elastomer is moulded, also achieving a mechanical interlock, albeit indirectly through the cage, with the body. Such re-entrants could be provided in the bore of the stator tube in the case of PC pumps and motors but, of course, providing such re-entrants is problematic. Recently, there have been several designs of stators that bond mechanically to the outer tube (thereby eliminating the need for an adhesive) and U.S. Pat. No. 7,407,372, U.S. Pat. No. 7,316,548 and U.S. Pat. No. 7,329,106 disclose different methods of mechanically bonding stator inserts to inner perforated stator tubes that are connected by welding to the outer stator tube. The inner stator tubes incorporate radial apertures and are placed and welded to the outer tube prior to the injection moulding of the stator material.

Such stators are assembled by disposing an appropriate anchor element within the outer tube and permanently fixing the two together, typically using welded fixings at various locations along the length of tubes, prior to injection moulding the stator material. Furthermore, a fluid seal between the stator material and the outer stator tube is always necessary and, where no special adhesion is employed, another means is required of achieving it. In the patents just mentioned, this is, for example, achieved using sealing rings that compress the stator material following injection moulding.

BRIEF SUMMARY OF THE DISCLOSURE

According to one embodiment disclosed herein, there is provided a stator for a progressive cavity pump or motor, comprising:
  a stator housing having a longitudinal axis; and
  a stator insert of a material moulded within the housing, the stator housing further comprising,
  an outer tube having an inner surface;
  a plurality of framework elements disposed on the inner surface of the outer tube;
  at least one recess in the inner surface of the outer tube;
wherein the conjunction of said framework elements and said at least one recess defines a plurality of chambers receiving insert material therein whereby said insert material is mechanically fixed axially, radially and torsionally within the outer tube.

The framework elements are preferably a plurality of rods. The rods may extend axially, substantially parallel to said longitudinal axis and are circumferentially spaced from each other on the inner surface of the outer tube.

Alternatively, the rods may be annular, extending around the inner surface of the outer tube and being axially spaced from each other with respect to said longitudinal axis.

Preferably, the framework elements have a circular or elliptical cross-sectional shape. The smooth or rounded profile of the framework elements minimises the risk of damage to the stator insert material when the progressive cavity pump or motor is in operation.

Preferably the framework elements are welded to said inner surface of the outer tube.

In one embodiment, said at least one recess comprises a helical recess extending partially or fully axially along the inner surface of the outer tube.

Alternatively said at least one recess comprises a plurality of recesses, for example axially spaced annular grooves. Further alternatively, the recesses may comprise circumferentially spaced linear grooves, extending parallel with respect to the longitudinal axis.

The grooves may be equally axially or circumferentially spaced. Preferably, said grooves have a substantially square or rectangular cross-sectional shape.

In accordance with a another embodiment disclosed herein, there is provided a stator housing substantially as described herein and/or with reference to the accompanying figures.

In accordance with another embodiment disclosed herein, there is provided a method of assembling a stator as described in any of the preceding paragraphs, comprising the steps of:

disposing a mould core within the outer tube;

injecting liquid stator insert material between the outer housing and core so that the material penetrates the chambers; and removing the core when the material has cured.

BRIEF DESCRIPTION OF THE DRAWINGS

Preferred embodiments of the invention are described hereinafter, by way of example only, with reference to the accompanying drawings, in which:

FIG. 5 shows in perspective view the stator housing of FIG. 4.

DETAILED DESCRIPTION

Figure 1:
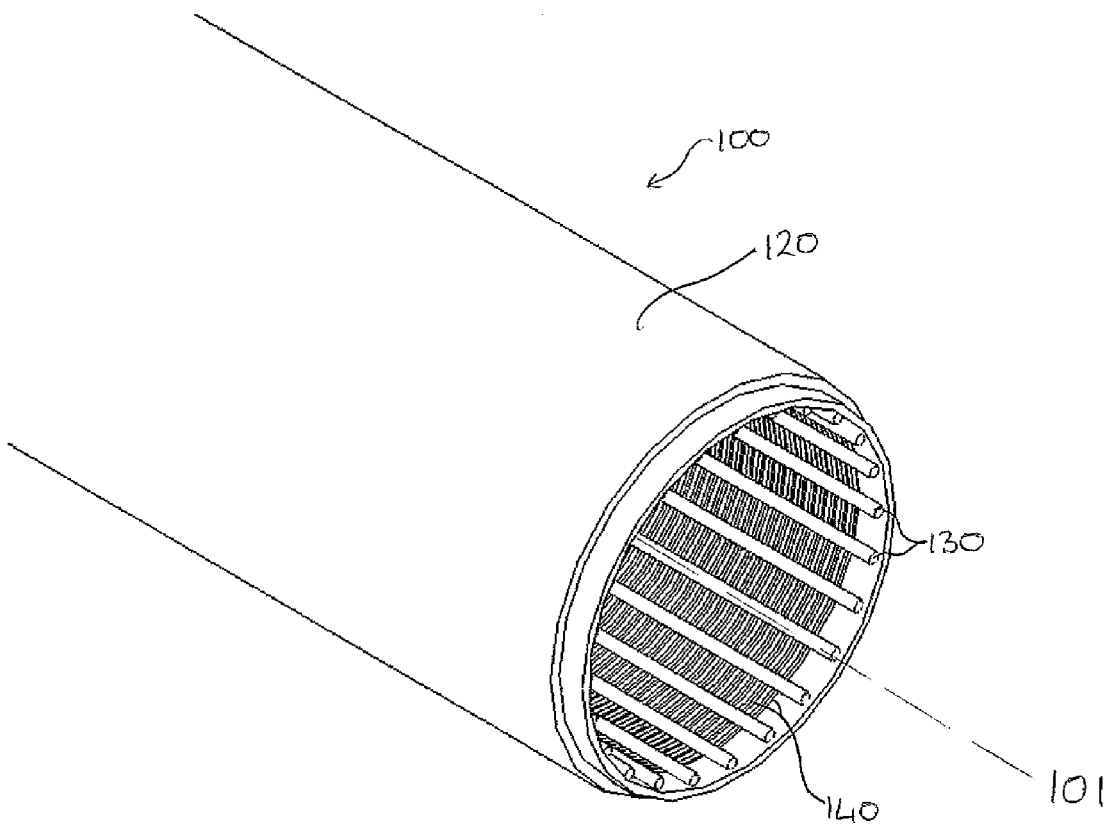
FIG. 1 shows in perspective view components of a stator housing according to an embodiment of the invention.
Figure 2:
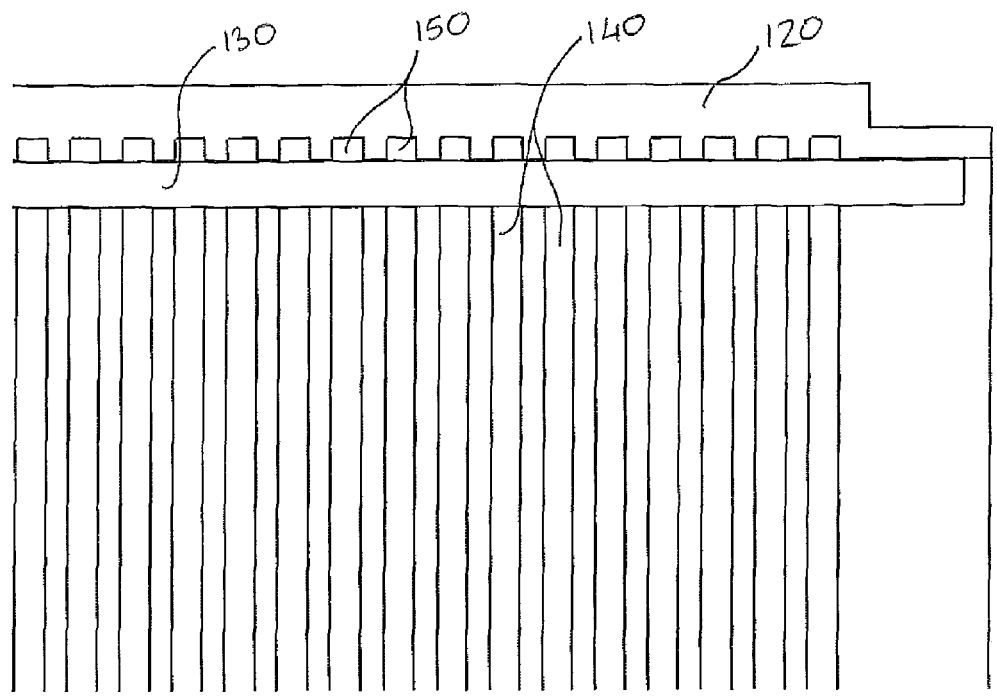
FIG. 2 shows in cross-sectional view detail of the stator housing of FIG. 1.
Figure 3:
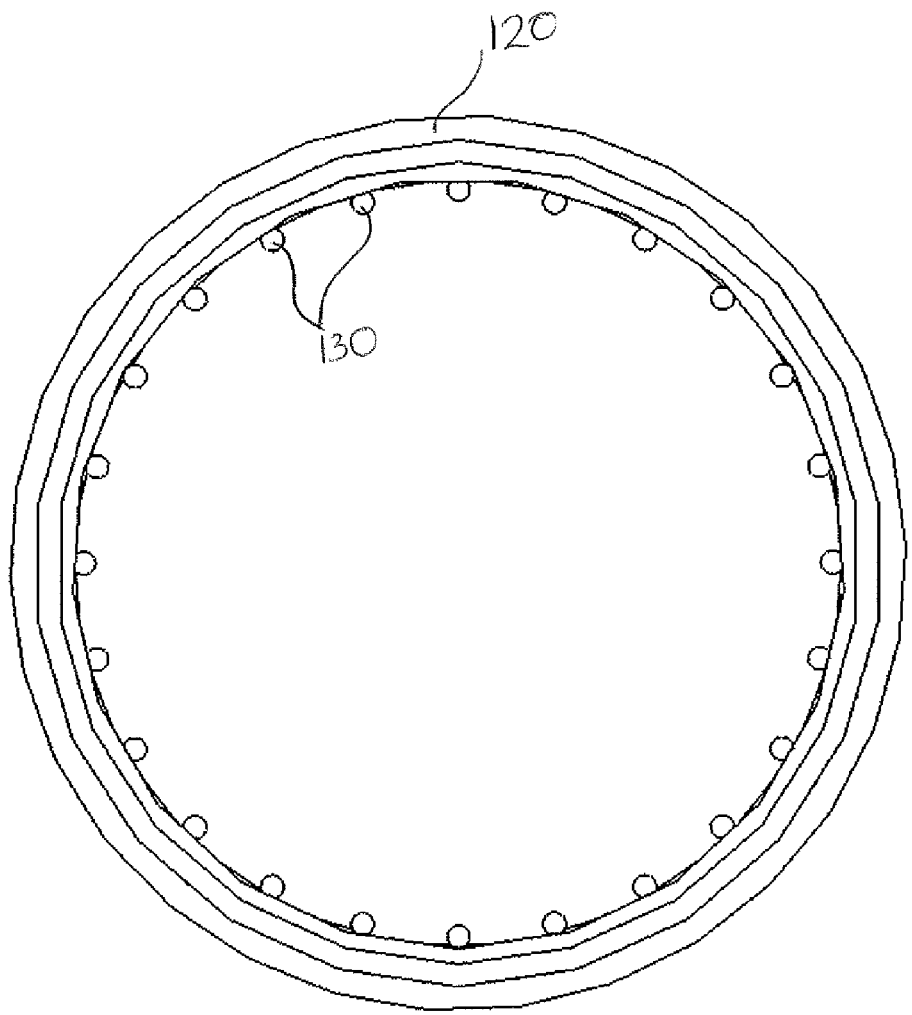
FIG. 3 shows an end view of the stator housing of FIG. 1.

Referring to FIGS. 1-3, there is provided a stator housing 100 for a stator of a progressive cavity (PC) pump or motor. The housing comprises a sleeve-shaped outer tube 120 and has a longitudinal axis 101.

The outer tube 120 is provided with a plurality of framework elements in the form of rods 130 on the inner surface thereof. In the illustrated embodiment, the substantially linear rods 130 extend in an axial direction along the inner surface of the tube 120 and are preferably equally circumferentially spaced.

In an alternative embodiment (not illustrated), the framework elements comprise a plurality of substantially annular rods, axially spaced along the longitudinal axis of the outer tube. Other embodiments of the framework elements are envisaged.

The rods may be made from a mild steel and welded to the inner surface of the tube, although other materials and fixing methods are possible. The rods preferably have a circular (as illustrated) or elliptical cross sectional shape. Other cross-sectional shapes are possible, although it is advantageous for the rods to have a smooth, rounded or otherwise non-blunt profile for reasons set out below.

The outer tube 120 is provided with at least one recess in the inner surface thereof. In the illustrated example, the at least one recess comprises a plurality of annular grooves 140. The grooves 140 are axially spaced along the outer tube and preferably, although not necessarily, extend along the whole length of the tube.

In an alternative embodiment (not illustrated), the at least one recess is one or more helical grooves in the inner surface of the outer tube.

In a further alternative embodiment (not illustrated), the at least one recess comprises a plurality of linear grooves in the inner surface of the outer tube, the linear grooves extending in an axial direction substantially parallel with respect to the longitudinal axis. The linear grooves are preferably equally circumferentially spaced.

The grooves have a generally square or rectangular cross-sectional shape, although other shapes are possible. A square or rectangular cross-sectional shape has the advantage of having clearly defined side walls which, in use, improve resistance to axial forces on the stator insert material. The grooves may be individually machined into the inner surface of the outer tube.

As is best seen in FIG. 2, the conjunction of the framework elements and the recesses define chambers 150 in the inner surface of the outer tube 120. In the illustrated embodiment, at each position where one of the linear rods 130 crosses one of the annular grooves 140, a chambers 150 is defined.

The walls and base of each chamber 150 are defined by the groove 140, whilst the "top" of the chamber 150 is provided by the rod 130. The "top" of the chamber is not closed or sealed. This is partly because the rod and groove do not actually intersect (the rod being located radially inward of the groove) and is partly because the groove extends (axially, helically or circumferentially depending on the embodiment) beyond the small area of the rod that coincides with the groove.

Figure 4:
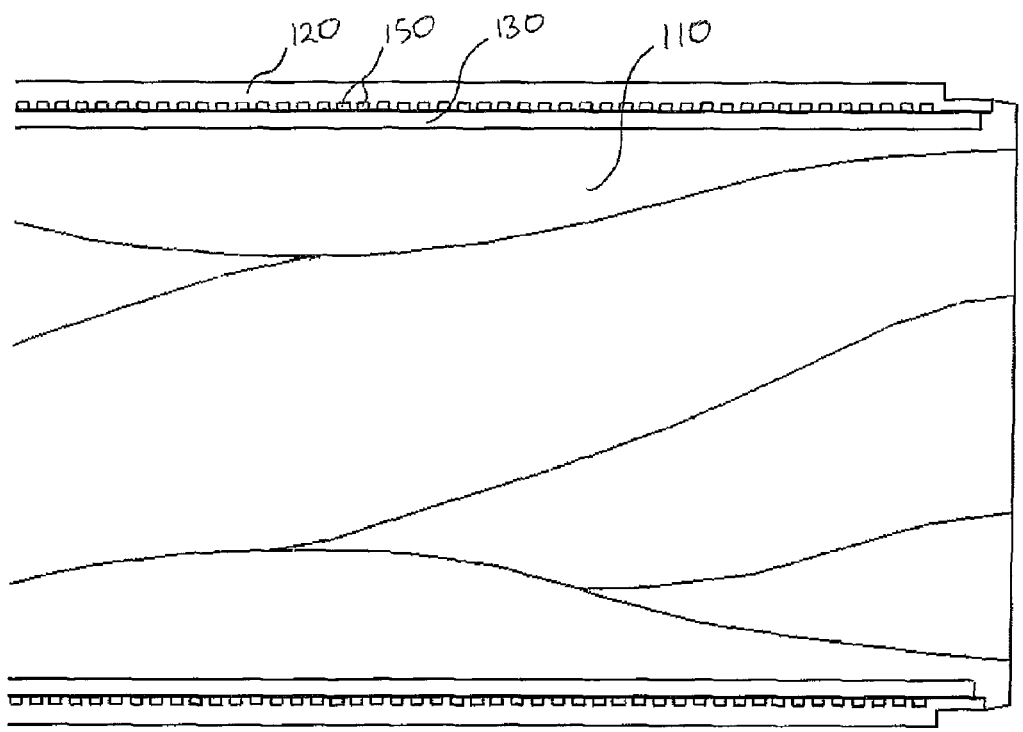
FIG. 4 shows a cross-sectional view of a stator according to an embodiment of the invention, with the stator insert in place.

FIGS. 4 and 5 show the stator housing including the stator insert 110. The stator insert is generally formed by moulding. After assembly of the housing 100, a mould core with a double, or more, helical thread form (not shown) is inserted in a known manner in a bore of the housing 100. Elastomeric material is injected into the annular space between the core and the housing so that the elastomeric material penetrates grooves 140 and in particular, chambers 150. When the elastomeric or plastic stator material has been injected into the housing 100, the rods 130 are embedded in the material of the stator insert 110. The material of the stator insert also extends to the inner surface of the outer tube 120.

Typically, upon cooling, the injected stator insert material shrinks radially inwards. This tendency is resisted by the presence of the longitudinal rods 130 which hold the stator insert 110 tight against the inner surface of the outer tube, assisted by the presence of stator insert material in the chambers 150.

Axial forces between the stator insert 110 and the outer tube 120 are resisted by the presence of stator insert material in the chambers 150 and in particular the depth of the grooves 140. A square or rectangular cross-sectional shape for the grooves 140 further assists in resisting the axial forces by virtue of the well-defined side walls of such grooves.

In operational use of the PC pump, there are significant torsional forces between the stator insert 110 and outer tube 120. These are resisted by the presence of the longitudinal rods 130. The curved outer edge, or rounded profile of each rod reduces the risk of shearing or otherwise damaging the stator insert material in the immediate vicinity thereof. This gives the present invention a particular advantage over prior art systems which use circular or other blunt-edged apertures through which stator insert material is moulded. In the prior art having inner stator tubes incorporating radial apertures, the radial apertures through which the stator insert material is moulded are generally circular in nature. The high axial and torsional forces between the rotor and the stator mentioned above means that it is possible for the blunt edges of the circular apertures to increase the risk of shearing off or otherwise damaging the stator insert material moulded therethrough.

Mechanical retention of the stator insert 110 using the present invention is sufficient to avoid the need to rely upon chemical bonding agents, this being especially advantageous at high operating temperatures where chemical bonds may fail. At lower operating temperatures, the present invention could be used in conjunction with chemical bonding agents in order to further improve the retention of the stator insert in the stator housing.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A stator for a progressive cavity pump or motor, comprising:
    a stator housing having a longitudinal axis; and
    a stator insert of a material moulded within the housing;
    wherein the stator housing includes,
        an outer tube having an inner surface;
        a plurality of parallel rods disposed on the inner surface of the outer tube, wherein the plurality of parallel rods extend axially relative to the longitudinal axis and are circumferentially spaced from each other on the inner surface of the outer tube;
        plurality of axially-spaced annular grooves in the inner surface of the outer tube, wherein the plurality of parallel rods cross over the plurality of annular grooves;
        wherein a conjunction of the plurality of parallel rods and the plurality of annular grooves defines a plurality of chambers, wherein each chamber is disposed in one of the plurality of annular grooves under one of the plurality of parallel rods, wherein the material of the stator insert extends into the plurality of chambers whereby the material of the stator insert is mechanically fixed axially, radially and torsionally within the outer tube.

2. The stator of claim 1 wherein the plurality of parallel rods have a circular or elliptical cross-sectional shape.

3. The stator of claim 1 wherein the plurality of parallel rods are attached to the inner surface of the outer tube with a welded connection.

4. The stator of claim 1 wherein the grooves have a square or rectangular cross-sectional shape.

5. A method of assembling the stator of claim 1, comprising:
    disposing a mould core within the outer tube;
    injecting the material of the stator insert as a liquid between the outer housing and core so that the stator insert material penetrates the chambers;
    allowing the material of the stator insert to cure; and
    removing the core after the material of the stator insert has cured.

6. A stator for a progressive cavity pump or motor, comprising:
    a stator housing having a longitudinal axis, wherein the stator housing includes:
        an outer tube having an inner surface, wherein the inner surface includes a plurality of parallel, spaced recesses;
        a plurality of parallel framework elements disposed within the outer tube along the inner surface, wherein each of the plurality of parallel framework elements extends across the plurality of parallel recesses;
        a plurality of chambers radially positioned between the outer tube and the plurality of parallel framework elements, wherein each of the plurality of chambers is disposed at the intersection of one of the plurality of parallel recesses and one of the plurality of parallel framework elements;
    a stator insert mounted within the housing, wherein the stator insert extends into the chambers.

7. The stator of claim 6 wherein the plurality of framework elements comprise a plurality of elongate linear rods.

8. The stator of claim 7 wherein the plurality of elongate linear rods are circumferentially spaced and oriented parallel to the longitudinal axis.

9. The stator of claim 8 wherein the plurality of elongate linear rods are uniformly circumferentially spaced.

10. The stator of claim 8 wherein the plurality of elongate linear rods have a circular or elliptical cross-sectional shape.

11. The stator of claim 8 wherein the framework elements are welded to the inner surface of the outer tube.

12. The stator of claim 8 wherein each recess has a square or rectangular cross-sectional shape.

* * * * *